United States Patent [19]

Wagner et al.

[11] Patent Number: 4,548,354

[45] Date of Patent: Oct. 22, 1985

[54] VEHICLE-TYPE THERMOSTAT CONSTRUCTION AND METHOD OF MAKING THE SAME

[75] Inventors: Joseph P. Wagner, Knoxville; Boyd P. Sliger, Concord, both of Tenn.

[73] Assignee: Robertshaw Controls Company, Richmond, Va.

[21] Appl. No.: 593,386

[22] Filed: Mar. 26, 1984

[51] Int. Cl.[4] .............................................. F01P 7/02
[52] U.S. Cl. ...................................... 236/345; 236/100
[58] Field of Search ........................ 236/34, 34.5, 100

[56] References Cited

U.S. PATENT DOCUMENTS

| | | | |
|---|---|---|---|
| 2,830,767 | 4/1958 | Herbenar | 236/34.5 |
| 2,837,285 | 6/1958 | Urban | 236/34.5 |
| 2,873,070 | 2/1959 | Drapeau | 236/34 |
| 3,194,009 | 7/1965 | Baker | 236/100 X |
| 3,315,890 | 4/1967 | Drapeau | 236/34 |
| 3,454,220 | 7/1969 | Bentz et al. | 236/34 |
| 3,734,405 | 5/1973 | Wagner | 236/34.5 |
| 4,022,377 | 5/1977 | Wagner et al. | 236/34.5 |
| 4,091,991 | 5/1978 | Sliger | 236/34.5 |
| 4,426,036 | 1/1984 | Sliger | 236/34.5 |

*Primary Examiner*—William E. Tapolcai
*Attorney, Agent, or Firm*—Candor, Candor & Tassone

[57] ABSTRACT

A single valve vehicle-type thermostat construction and method of making the same are provided, the thermostat construction comprising a temperature responsive device having a piston member and a cylinder member that are adapted to provide relative movement therebetween when the device senses certain temperatures, a single valve seat unit being operatively interconnected to one of the members, a single valve closure unit being operatively interconnected to the other of the members and being adapted to control fluid flow through the valve seat in relation to the position of the valve closure unit relative to the valve seat unit as determined by the temperature being sensed by the device, a first spring operatively interconnected to one of the members and to one of the units to always tend to hold the units against each other in a closed condition so as to prevent any fluid flow through the valve seat unit and, thus, through the thermostat construction, and a second spring operatively interconnected to the members to continuously urge the members together with a loading force even when the units are against each other in the closed condition thereof.

20 Claims, 8 Drawing Figures

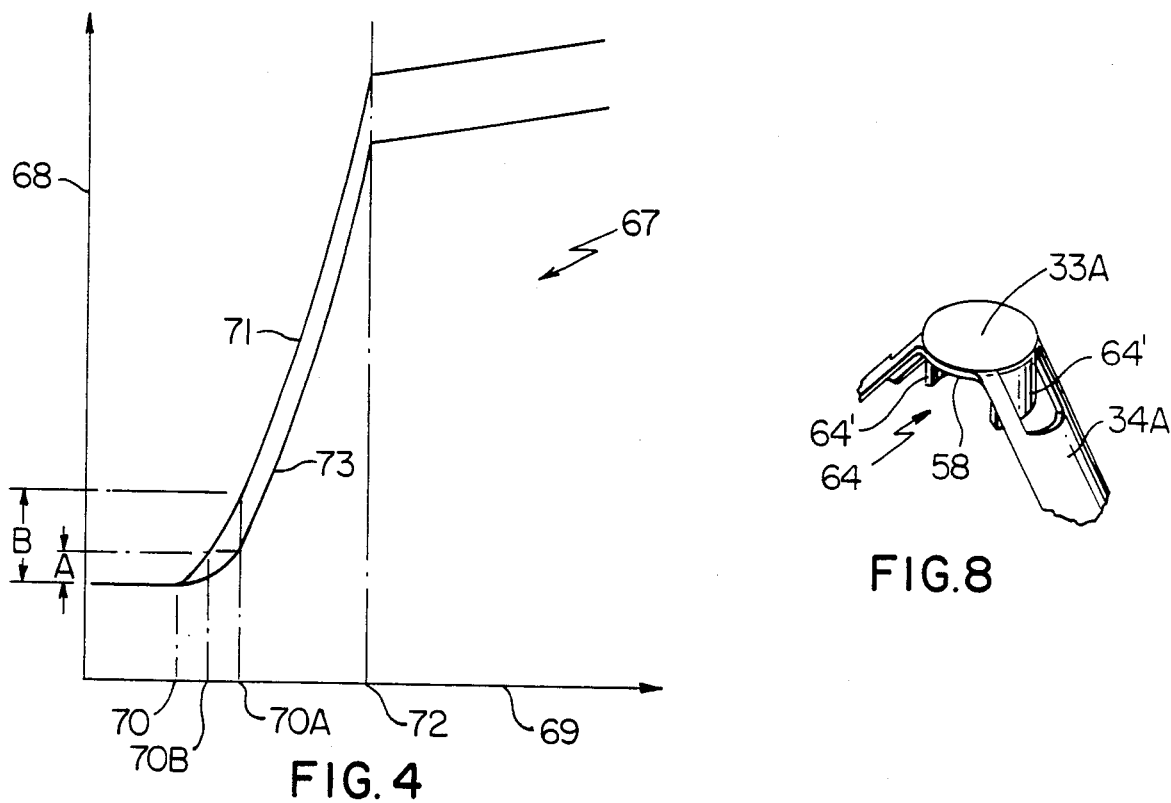
FIG. 4
FIG. 8
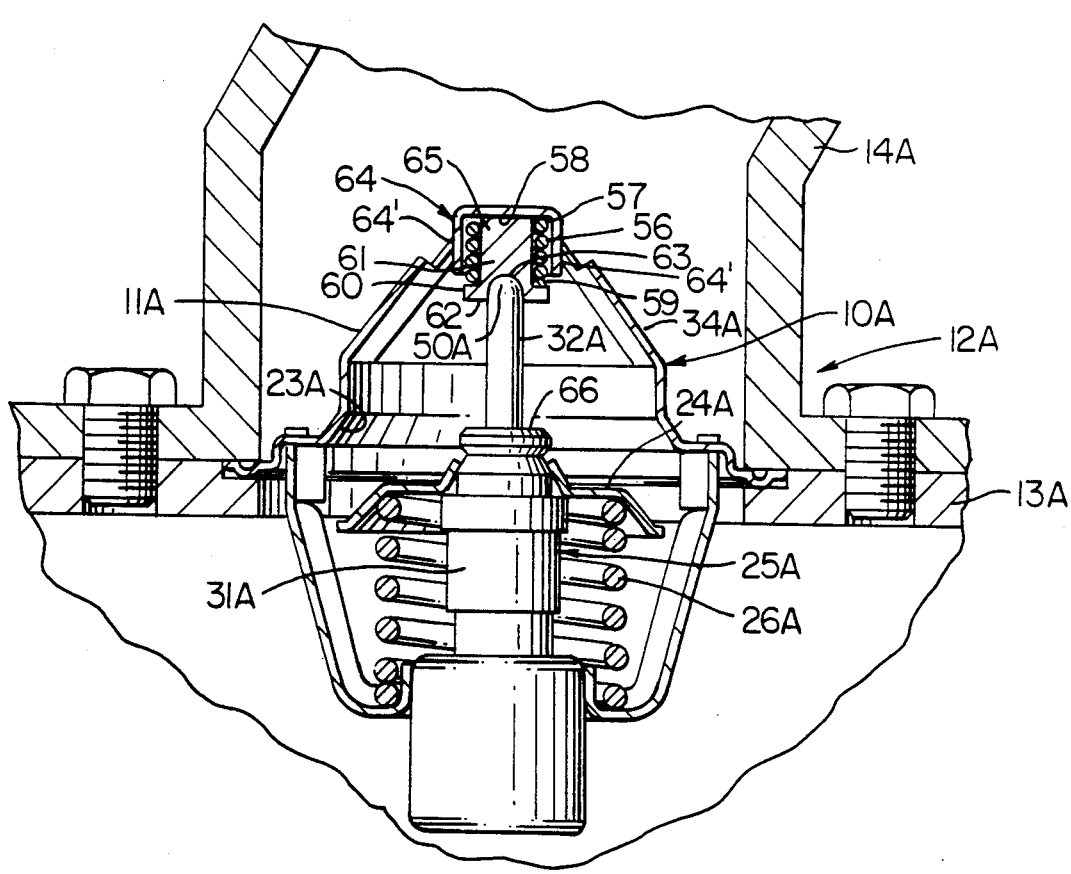
FIG. 7

VEHICLE-TYPE THERMOSTAT CONSTRUCTION AND METHOD OF MAKING THE SAME

BACKGROUND OF THE INVENTION

1. Field of the Invention

This invention relates to a vehicle-type thermostat construction and to a method of making the same.

2. Prior Art Statement

It is known to provide a vehicle-type thermostat construction comprising a temperature responsive device having a piston member and a cylinder member that are adapted to provide relative movement therebetween when the device senses certain temperatures, a valve seat unit being operatively interconnected to one of the members, a valve closure unit being operatively interconnected to the other of the members and being adapted to control fluid flow through the valve seat unit in relation to the position of the valve closure unit relative to the valve seat unit as determined by the temperature being sensed by the device, and spring means operatively interconnected to one of the members and to one of the units to always tend to hold the units against each other in a closed condition to prevent fluid flow through the valve seat unit. For example, see the U.S. Pat. No. 4,091,991 to Sliger, and the U.S. Pat. No. 3,734,405 to Wagner.

It appears that the spring 26 of the patent to Sliger, U.S. Pat. No. 4,091,991 and the springs 56 and 72 of the patent to Wagner, U.S. Pat. No. 3,734,405 do not impose any loading force between the piston and cylinder members 32, 31 and 44, 42 when the respective valve closure units 24 and 62 are disposed against the respective valve seat units 33 and 26.

SUMMARY OF THE INVENTION

It is one feature of this invention to provide a new vehicle-type thermostat construction wherein the effects of liquid leaking into the temperature responsive device have been reduced as well as wherein a new operation of the construction is provided.

In particular, it was found according to the teachings of this invention that when a vehicle-type thermostat construction is in the closed position thereof, liquid can leak into the temperature responsive device thereof to affect the resulting stroke of the thermostat construction.

It is believed, according to the teachings of this invention, that this leakage situation can be substantially eliminated if a spring force continuously acts to urge the piston member and cylinder member of the temperature responsive device together with a certain loading force when the units are disposed against each other in the closed condition thereof.

It was further found according to the teachings of this invention that when such a spring is utilized in the above manner, such spring caused the valve closure member or unit to open relative to the valve seat member or unit of the thermostat construction with a smooth and gradual movement rather than with an abrupt movement as in the past whereby a new operation of the thermostat construction of this invention is provided.

For example, one embodiment of this invention provides a single valve vehicle-type thermostat construction comprising a temperature responsive device having a piston member and a cylinder member that are adapted to provide relative movement therebetween when the device senses certain temperatures, a single valve seat unit being operatively interconnected to one of the members, a single valve closure unit being operatively interconnected to the other of the members and being adapted to control fluid flow through the valve seat unit in relation to the position of the valve closure unit relative to the valve seat unit as determined by the temperature being sensed by the device, spring means operatively interconnected to one of the members and to one of the units to always tend to hold the units against each other in a closed condition so as to prevent any fluid flow through the valve seat unit and, thus, through the thermostat construction, and another spring means opeatively interconnected to the members to continuously urge the members together with a loading force even when the units are against each other in the closed condition thereof.

Accordingly, it is an object of this invention to provide a new vehicle-type thermostat construction having one or more of the novel features of this invention as set forth above or hereinafter shown or described.

Another object of this invention is to provide a new method of making such a vehicle-type thermostat construction, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 4 is a graph illustrating the opening movement of the prior known thermostat construction of FIGS. 1 and 2 and the opening movement of the vehicle-type thermostat construction of this invention that is illustrated in FIGS. 5 and 6.

FIG. 7 is a view similar to FIG. 6 and illustrates the vehicle-type thermostat construction of FIG. 5 after a spring thereof has bottomed out.

FIG. 8 is a fragmentary top perspective view of the vehicle-type thermostat construction of FIG. 5.

DESCRIPTION OF THE PREFERRED EMBODIMENT

Figure 1:
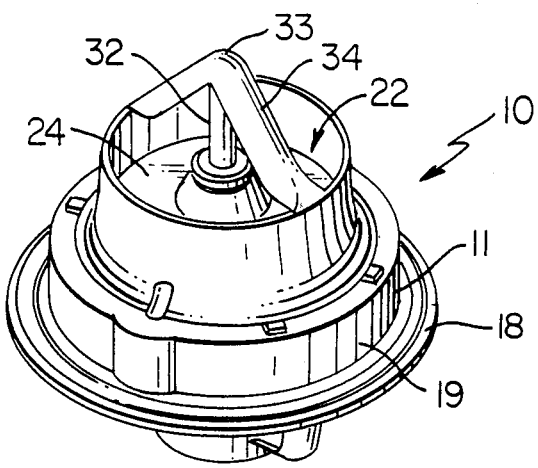
FIG. 1 is a top perspective view of a prior known vehicle-type thermostat construction.

While the various features of this invention are hereinafter illustrated and described as being particularly adapted to provide a thermostat construction for vehicles, it is to be understood that the various features of this invention can be utilized singly or in any combination thereof to provide a thermostat construction for other products as desired.

Therefore, this invention is not to be limited to only the embodiment illustrated in the drawings, because the drawings are merely utilized to illustrate one of the wide variety of uses of this invention.

Figure 2:
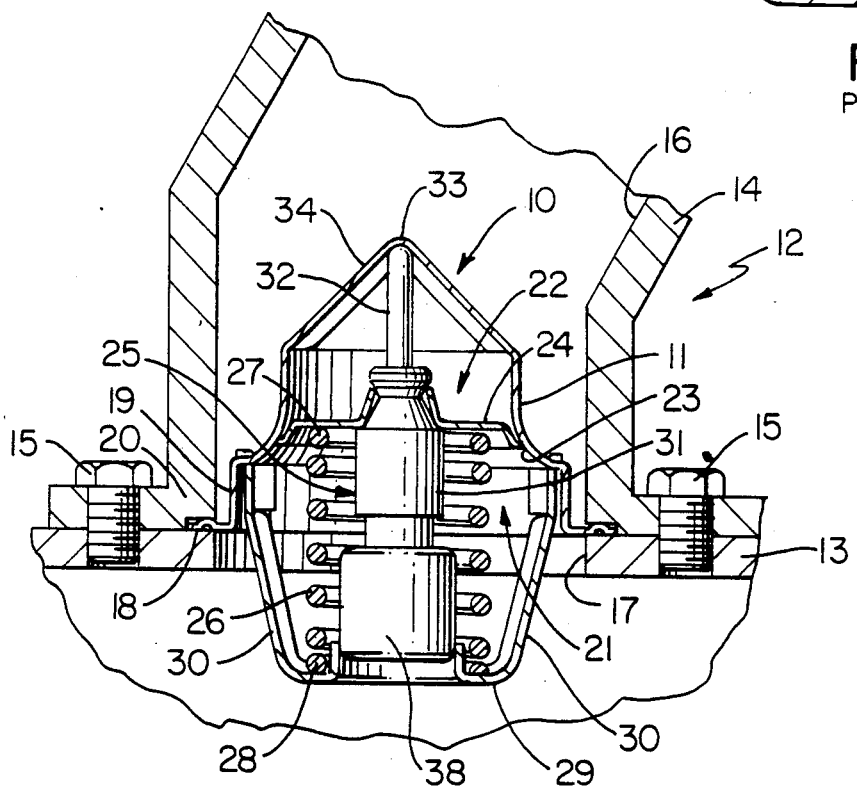
FIG. 2 is a cross-sectional view illustrating the prior known vehcile-type thermostat construction of FIG. 1 mounted in a vehicle cooling system for controlling the same.

Referring now to FIGS. 1 and 2, a prior known vehicle-type thermostat construction is generally indicated by the reference numeral 10 and comprises a housing means 11 adapted to be inserted in an engine cooling system that is generally indicated by the reference numeral 12 in FIG. 2 and comprising a conduit means 13 having an outlet housing 14 secured thereto by fastening bolts 15 so that a passage 16 of the outlet housing 14 is in aligned relation with an opening 17 in the housing 13.

The housing means 11 of the thermostat construction 10 has an outwardly directed annular flange 18 extending from one end of a cylindrical housing section 19, the annular flange 18 being adapted to be sandwiched between a stepped annular flange 20 of the outlet housing 14 and the conduit 13 so as to completely block the interconnection between the conduit 13 and the outlet housing 14.

However, the housing means 11 of the thermostat construction 10 is provided with an inlet 21 that is adapted to be disposed in fluid communication with the conduit 13 and an outlet 22 that is adapted to be disposed in fluid communication with the passage 16 of the outlet housing 14, the housing means 11 having an annular valve seat surface or unit 23 between the inlet and outlet 22 thereof that is adapted to be opened and closed by a movable valve closure member or unit 24 carried by a piston and cylinder temperature responsive device that is generally indicated by the reference numeral 25 and is conventional in the art. The valve closure unit 24 is urged toward its closed position against the valve seat unit 23 by a compression spring 26 having one end 27 bearing against the valve closure unit 24 and the other end 28 thereof bearing against a spring retainer 29 interconnected to the housing means 11 by a pair of integral strap members 30.

The piston and cylinder temperature responsive device 25 has a cylinder member 31 carrying the valve closure unit 24 and a piston member 32 bearing against an apex 33 of a V-shaped strap 34 that is formed integrally with the housing means 11 as illustrated. Thus, upon the heating of a wax charge 35, FIG. 3, in the cylinder member 31 that causes the wax charge 35 to expand when the same reaches a certain temperature, the piston and cylinder device 25 causes the cylinder member 31 and, thus, the valve closure unit 24 to move downwardly in FIG. 2 in opposition to the force of the compression spring 26 to open the valve seat unit 23 in a manner well known in the art and permit some of the fluid passing through the conduit 13 to be bypassed into the outlet housing 14 and be cooled in the engine radiator before the same is passed back to the cooling system conduit 13 in a manner well known in the art. Of course, when the temperature being sensed by the device 25 is below the predetermined condition, the wax charge 35 contracts and the compression spring 26 will move the valve closure member 24 to close the valve seat unit 23 and thereby prevent fluid communication between the conduit 13 and the outlet housing 14.

Since the prior known thermostat construction 10 and its use in the engine cooling system 12 previously described is the same type thermostat construction illustrated and described in the aforementioned patent to Sliger, U.S. Pat. No. 4,491,991, this patent is being incorporated into this disclosure by this reference thereto.

Figure 3:
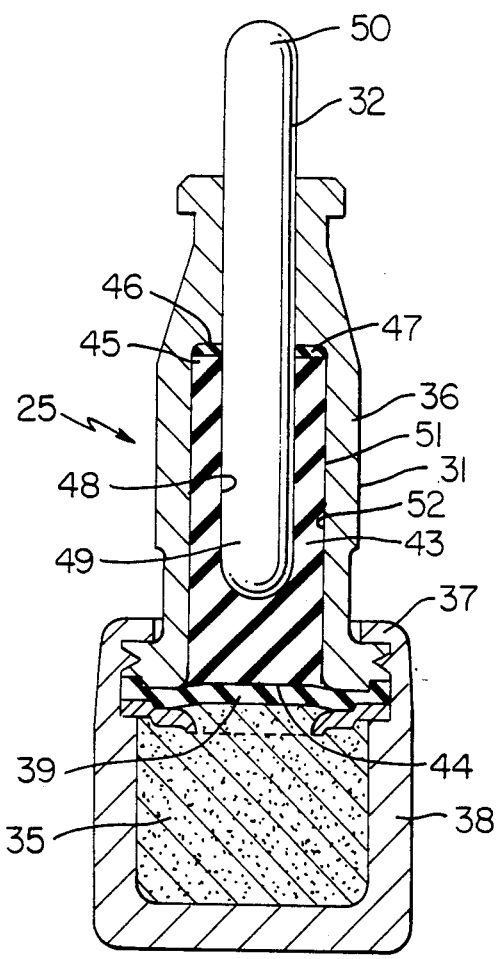
FIG. 3 is an enlarged cross-sectional view illustrating the structure of the temperature responsive device of the thermostat construction of FIGS. 1 and 2.

The temperature responsive device 25 is conventional in the art and is best illustrated in FIG. 3, the temperature responsive device 25 being fully described in the U.S. Pat. No. 3,719,085 to Sliger, whereby this patent is also being incorporated into this disclosure by this reference thereto so that only the details of the temperature responsive device 25 believed necessary to understand the features of this invention will now be described.

As illustrated in FIG. 3, the cylinder member 31 includes an upper tubular part 36 secured to an open end 37 of a cup-shaped lower part 38, a flexible diaphragm 39 having its outer peripheral portion 40 sealed between an outwardly turned annular flange 41 on the upper tubular part 36 and a shoulder defining means 42 of the lower cup-shaped part 38 whereby the flexible diaphragm 39 not only transmits volumeric changes of the wax charge 35 within the cup-shaped part 38 to the piston member 32 as will be apparent hereinafter, but also the diaphragm 39 tends to prevent any liquid that has leaked into the device 25 from reaching the wax charge 35.

A resilient cylindrical member 43 is disposed in the upper tubular part 36 and has its lower end 44 bearing against the diaphragm 39 while its upper end 45 is sealed against an internal shoulder 46 of the tubular part 36 by a flexible seal means 47. The resilient member 43 has an opening 48 in the upper end 45 thereof that receives the lower end 49 of the piston member 32 which has its other end 50 projecting out of the cylinder member 31 as illustrated.

Thus, it can be seen that when the wax charge 35 has its volume expanded due to the heating thereof to a certain temperature, the expanding wax charge 35 acts against the flexible diaphragm 39 to move the diaphragm upwardly in FIG. 3 and push on the resilient member 43 to cause the piston member 32 to extend upwardly out of the cylinder member 31 a certain distance in relation to the certain temperature being sensed by the device 25. The piston member 32 is retracted into the cylinder member 31 as the wax charge 35 decreases its volume through a decrease in sensed temperature because the compression spring 26 is continuously urging the cylinder member 31 upwardly in FIG. 2 relative to the fixed piston member 32 until the valve closure unit 24 seats against the valve seat unit 23 whereby the effective force of the compression spring 26 tending to urge the piston member 32 and cylinder member 31 together is terminated by the valve closure unit 24 seating against the valve seat unit 23.

It has been found that during the use of the thermostat construction 10 in the manner illustrated in FIG. 2, liquid tends to seep between the piston member 32 and the cylinder member 31 and around the outside surface 51 of the resilient member 43 and the inside surface 52 of the cylinder part 36 in a manner to reach the end 44 of the resilient member 43 and become disposed between the end 44 of the member 43 and the diaphragm 39 so that upon a subsequent expansion of the wax charge 35 in the cylinder member 31, the piston member 32 has a different stroke relative to the cylinder member 31 and thereby causes the valve closure unit 24 to open at a different temperature than the desired predetermined temperature of the particular wax charge 35 that was selected for use with the thermostat construction 10.

Accordingly, as previously set forth, it was found according to the teachings of this invention that such leakage of liquid to the end 44 of the resilient member 43 so as to accumulate between the end 44 and the diaphragm 39 could be substantially eliminated if a loading force was maintained between the members 31 and 32 when the valve closure unit 24 is seated against the valve seat unit 23 so that the loading force will maintain the resilient member 43 in an expanded condition against the diaphragm 39 to prevent any gaps or areas for moisture to accumulate adjacent the diaphragm 39.

It was found according to the teachings of this invention that such loading force could be provided by an additional spring disposed between the end 50 of the piston member 32 and the apex 33 of the strap 34 of the housing means 11.

Figure 5:
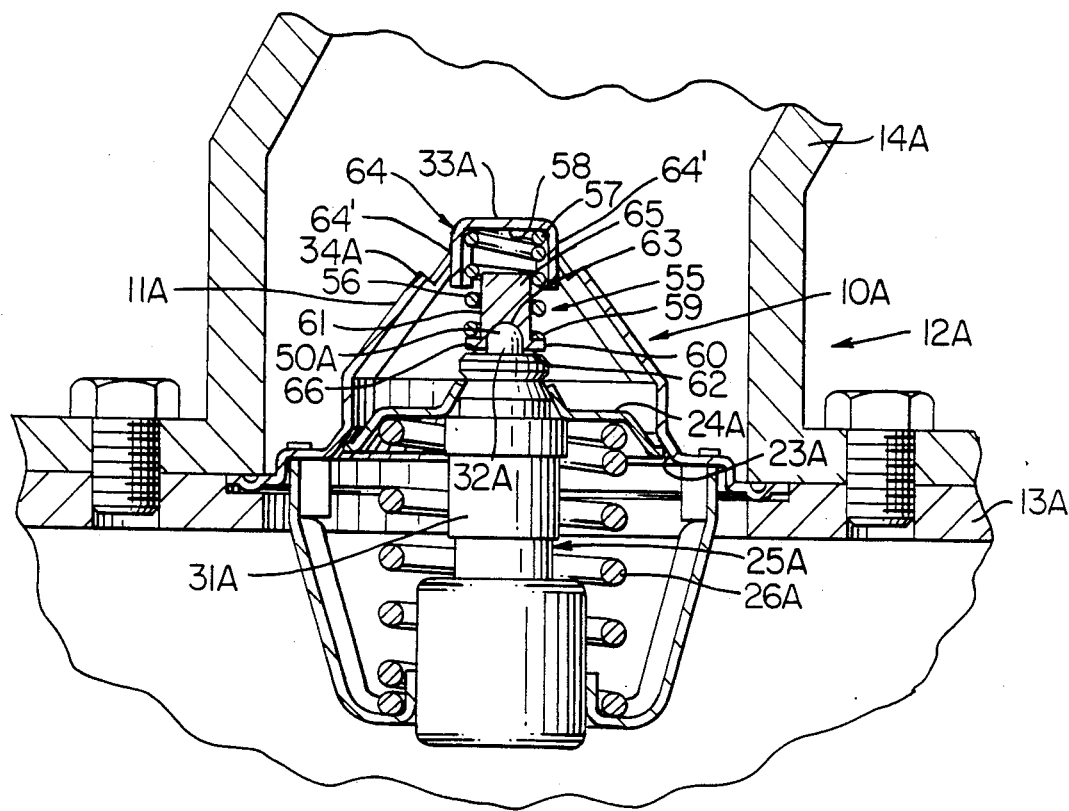
FIG. 5 is a view similar to FIG. 2 and illustrates the vehicle-type thermostat construction of this invention with the thermostat construction being disposed in its closed condition.
Figure 6:
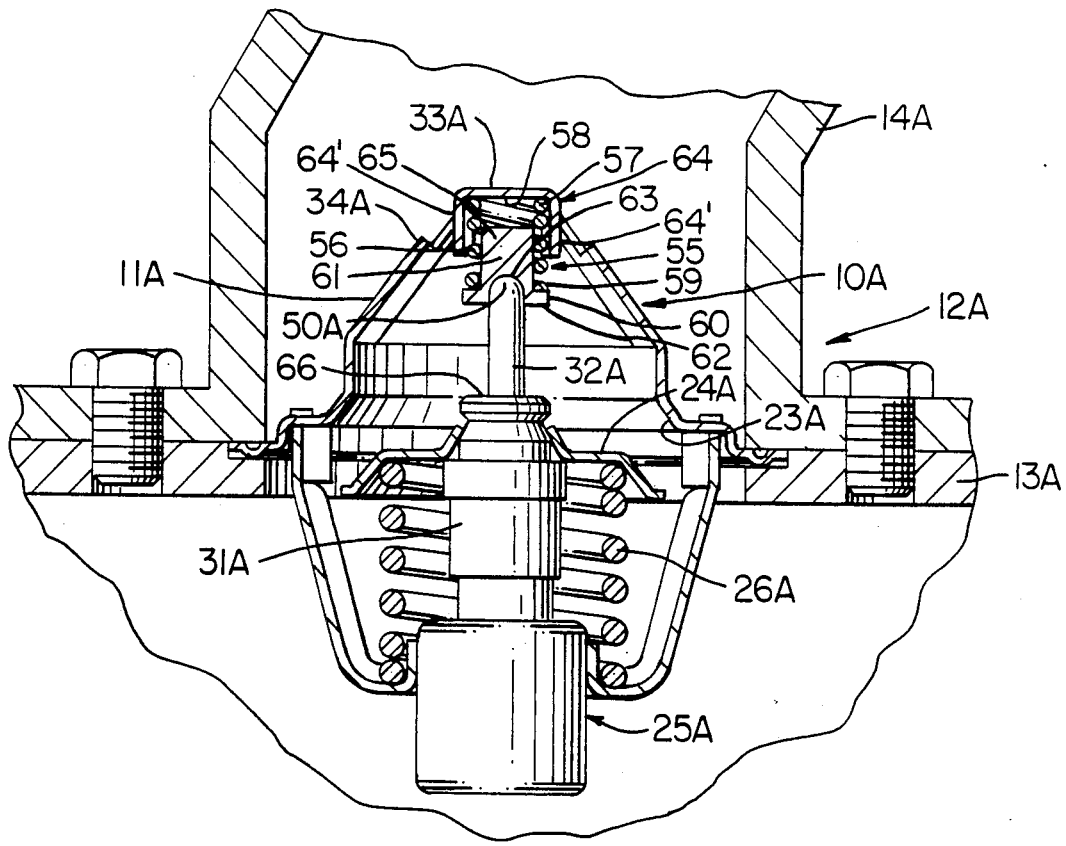
FIG. 6 is a view similar to FIG. 5 and illustrates the vehicle-type thermostat construction of FIG. 5 in its open condition for a full flow of fluid therethrough.

Such additional spring arrangement of this invention is generally indicated by reference numeral 55 in FIGS. 5 and 6 wherein the thermostat construction of this invention is generally indicated by the reference numeral 10A and is illustrated as being utilized in the vehicle cooling system that is generally indicated by the reference numeral 12A. Since the thermostat construction 10A of this invention and the cooling system 12A therefor are substantially the same as the thermostat construction 10 and cooling system 12 previously described in connection with FIGS. 1 and 2, parts of the thermostat construction 10A and cooling system 12A that are similar to the thermostat construction 10 and cooling system 12 of FIGS. 1 and 2 will be indicated by like reference numerals followed by the reference letter "A".

As in FIGS. 5 and 6, the spring means 55 comprises a compression spring 56 having one end 57 bearing against a substantially flattened surface 58 of the apex 33A of the strap means 34A of the housing means 11A of the thermostat construction 10A as illustrated. The other end 59 of the spring 56 bears against an outwardly directed annular flange 60 of a spring retainer member 61 that is disposed on the end 50A of the piston member 32A as illustrated, the spring retainer 61 having an end surface 62 interrrupted by a rounded bottomed opening 63 that receives the rounded end 50A of the piston member 32A therein as illustrated.

If desired, a tubular spring retaining means 64 can extend from the flattened surface 58 of the apex 33A of the strap means 34A to receive the end 57 of the spring 56 therein. For example, two tabs 64' can be carved from the strap means 34A as illustrated in FIG. 8 and be bent to be substantially parallel to each other to define the tubular spring retaining means 64.

Thus, it can be seen that the spring retainer 61 has a cylindrical body portion 65 thereof disposed within the end 59 of the spring 56 while the other end 57 of the spring 56 is disposed within the tubular retainer means 64 so that the spring 56 is maintained substantially coaxial with the main spring 26A and the piston member 32A and will continuously provide a loading force on the piston member 32A to tend to urge the same into the cylinder member 31A even when the valve closure unit 24A is seated against the valve seat unit 23A as illustrated in FIG. 5 because the end 62 of the spring retainer 61 is still spaced from the upper surface 66 of the cylinder member 31A at this closed condition of the thermostat construction 10A.

In this manner, it has been found that the continuous loading force of the compression spring 56 on the piston member 32A tending to urge the piston member 32A into the cylinder member 31A while the valve closure unit 24A is seated against the valve seat unit 23A, will prevent any liquid that leaks between the piston member 32A and the cylinder member 31A from reaching the area adjacent the diaphragm 39 of the piston and cylinder device 25 illustrated in FIG. 3 because the member 43 has its end 44 expanded against the cylinder member 31 and the diaphragm 39 by this loading force for the reasons previously set forth whereby it can be seen that it is a relatively simple method of this invention to make the thermostat construction 10A to include the spring means 55 between the end 50A of the piston member 32A and the housing means 11A to provide the spring loading force between the members 32A and 31A even when the valve closure unit 24A is seated against the valve seat unit 23A as illustrated in FIG. 5.

While the spring means 55 performs in the manner previously described to tend to prevent an accumulation of moisture between the diaphragm 39 and the end 44 of the resilient member 43 of the piston and cylinder device 25 illustrated in FIG. 3 for the reasons previously set forth, it has been found that such spring means 56 also changes the performance of the thermostat construction 10A in its opening movement of the valve closure unit 24A relative to the valve seat unit 23A.

In particular, reference is now made to FIG. 4 wherein a graph 67 is provided and has its Y axis 68 indicating the amount of stroke of the piston member 32 relative to the cylinder member 31 and its X axis 69 indicating the temperature that the device 25 senses so that at temperature 70, the device 25 begins to open the valve closure unit relative to the valve seat unit except that it has been found that without utilizing the spring means 55 of this invention, the stroke of the piston member 32 relative to the cylinder member 31 follows the line 71 as illustrated in FIG. 4 so that a relatively abrupt opening movement of the valve closure unit relative to the valve seat unit takes place between the opening temperature as indicated by the point 70 and the desired full flow open temperature as indicated by the point 70A on the graph 67 which may be on the order of 8° F. above the opening temperature at point 70. However, a full flow of fluid through the device 10 is provided at temperature 70B as the device 10 has a stroke A at this temperature 70B that provides a full flow.

However, when utilizing the spring means 55 of this invention it has been found that the stroke of the resulting thermostat construction 10A follows the line 73 illustrated in FIG. 4 so that it can be seen that the opening movement of the valve closure unit 24A relative to the valve seat unit 23A is a relatively smooth and gradual movement between the temperatures 70 and 70A to provide for the full fluid flow stroke A for greater control of the fluid flow between the conduit 13A and the outlet housing 14A, the spring 56 bottoming out against the surface 58 as illustrated in FIG. 7 when the device 25A is sensing the temperature 70A. In particular, it can be seen that for a temperature between the points 70B and 70A, the prior device 10 will provide a full flow of fluid through the device 10 whereas for the same temperature, the device 10A of this invention will provide a smaller amount of fluid flow because the stroke of the piston 32A is not as great as the stroke of the piston 32 for this temperature.

Therefore, it can be seen from the graph 67 of FIG. 4 that if a stroke of A is required to provide a full flow of fluid through the opened valve unit of either thermostat construction 10 or 10A, the prior device 10 provides for full flow through the narrower temperature range 70—70B whereas the device 10A of this invention will provide for full flow through the longer temperature range 70—70A, the device 10 providing the stroke B when sensing the temperature 70A and the device 10A providing the same stroke movement between the temperatures 70A and 72 as the device 10 because the spring 56 of the device 10A has bottomed out against the surface 58 at the temperature 70A as previously set forth.

Thus, it can be seen that by choosing the particular characteristics for the spring means 55 in combination with the spring means 26A as well as in combination with the particular temperature rating of the wax charge 35 of the device 25, the performance of the stroke of the resulting thermostat construction of this invention can be tailored to almost any desired stroke characteristic thereof whereby the spring means 55 of this invention performs a dual purpose, namely, substantially eliminates moisture accumulation in the temperature responsive device 25A and smooths out the opening movement of the valve closure unit 24A relative to the valve seat unit 23A in a manner that was not provided by the single spring arrangement 26 for the thermostat construction 10.

The operation of the thermostat construction 10A of this invention in the engine cooling system 12A will now be described.

With the thermostat construction 10A mounted in the manner illustrated in FIG. 5 and as long as the temperature being sensed by the temperature responsive device 25A is below the opening temperature 70, FIG. 4, of the thermostat 10A, the compression spring 26A maintains the valve closure unit 24A against the valve seat unit 23A to prevent fluid flow between the conduit 13A and the outlet housing 14A. The spring 56 provides a loading force on the piston member 32A tending to move the piston member 32A into the cylinder member 31A while the valve closure unit 24A is disposed against the valve seat unit 23A so as to tend to prevent moisture from accumulating between the flexible diaphragm 39 and the end 44 of the resilient member 43 for the reasons previously set forth.

When the temperature being sensed by the device 25A reaches the opening temperature 70 of the thermostat 10A, the wax charge within the device 25A has expanded in such a manner that the same first causes the spring 56 to slightly compress and then causes the cylinder member 31A to move relative to the piston member 32A and carry the valve closure unit 24A away from the valve seat 23A, the compression spring 56 causing the opening movement of the valve closure unit 24A relative to the valve seat unit 23A to be in a smooth manner such as provided by the line 73 on the graph 67 as the valve closure unit 24A is moved to its opened position for full fluid therethrough as illustrated in FIG. 7 and by the temperature 70A on the graph 67 of FIG. 4 because the spring 56 is gradually being compressed from the condition of FIG. 5 at temperature 70 until the spring 56 bottoms out at the condition of FIG. 7 at temperature 70A even though the spring 26 is also being gradually compressed from the condition thereof illustrated in FIG. 5 to the condition thereof illustrated in FIG. 7 for this temperature range 70—70A.

Of course, as the temperature being sensed by the device 25A drops from the temperature 70A that produced the condition illustrated in FIG. 7, the wax charge within the device 25A contracts and thereby the force of the compression spring 26A moves the cylinder member 31A upwardly relative to the piston member 32A and thereby moves the closure member 24A closer to the valve seat 23A so that the same will fully seat when the temperature being sensed is at the temperature 70 that causes the thermostat construction 10A to be in the closed condition illustrated in FIG. 5.

Therefore, it can be seen that this invention not only provides a new vehicle-type thermostat construction, but also this invention provides a new method of making such a thermostat construction.

While the form and method of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a single valve vehicle-type thermostat construction comprising a temperature responsive device having a piston member and a cylinder member that are adapted to provide relative movement therebetween when said device senses certain temperatures, a single valve seat unit being operatively interconnected to one of said members, a single valve closure unit being operatively interconnected to the other of said members and being adapted to control fluid flow through said valve seat unit in relation to the position of said valve closure unit relative to said valve seat unit as determined by the temperature being sensed by said device, and spring means operatively interconnected to one of said members and to one of said units to always tend to hold said units against each other in a closed condition so as to prevent any fluid flow through said valve seat unit and, thus, through said thermostat construction, the improvement comprising another spring means operatively interconnected to said members to continuously urge said members together with a loading force even when said units are against each other in said closed condition thereof.

2. A thermostat construction as set forth in claim 1 wherein said other spring means comprises a compression spring having opposed ends.

3. A thermostat construction as set forth in claim 2 wherein one of said ends of said spring operatively bears against one of said units and the other of said ends of said spring operatively bears against one of said members.

4. In a single valve vehicle-type thermostat construction comprising a temperature responsive device having a piston member and a cylinder member that are adapted to provide relative movement therebetween when said device senses certain temperatures, a single valve seat unit being operatively interconnected to one of said members, a single valve closure unit being operatively interconnected to the other of said members and being adapted to control fluid flow through said valve seat unit in relation to the position of said valve closure unit relative to said valve seat unit as determined by the temperature being sensed by said device, and spring means operatively interconnected to one of said members and to one of said units to always tend to hold said units against each other in a closed condition so as to prevent any fluid flow through said valve seat unit and, thus, through said thermostat construction, the improvement comprising another spring means operatively interconnected to said members to continuously urge said members together with a loading force even when said units are against each other in said closed condition thereof, said other spring means comprising a compression spring having opposed ends, one of said ends of said spring operatively bearing against said valve seat unit and the other of said ends of said spring operatively bearing against said piston member.

5. A thrmostat construction as set forth in claim 4 wherein said spring is coaxially aligned with said piston member.

6. A thermostat construction as set forth in claim 5 wherein said piston member has a free end, and including a spring retainer being carried on said free end of said piston member, said other of said ends of said spring bearing against said spring retainer.

7. A thermostat construction as set forth in claim 6 wherein said valve seat unit has a tubular projection means, said one of said ends of said spring being disposed in said tubular projection means to be retained thereby.

8. A thermostat construction as set forth in claim 1 wherein said other spring means cooperates with said device and the first-named spring means to provide for a relatively smooth and gradual opening of said units between said closed position thereof to a full flow open position thereof.

9. A thermostat construction as set forth in claim 8 wherein said other spring means comprises a compression spring.

10. A thermostat construction as set forth in claim 9 wherein the first-named spring means comprises a compression spring.

11. In a method of making a single valve vehicle-type thermostat construction, said method comprising the steps of providing a temperature responsive device having a piston member and a cylinder member that are adapted to provide relative movement therebetween when said device senses certain temperatures, operatively interconnecting a single valve seat unit to one of said members, operatively interconnecting a single valve closure unit to the other of said members so as to be adapted to control fluid flow through said valve seat unit in relation to the position of said valve closure unit relative to said valve seat unit as determined by the temperature being sensed by said device, and operatively interconnecting spring means to one of said members and to one of said units to always tend to hold said units against each other in a closed condition so as to prevent any fluid flow through said valve seat unit and, thus, through said thermostat construction, the improvement comprising the step of operatively interconnecting another spring means to said members to continuously urge said members together with a loading force even when said units are against each other in said closed condition thereof.

12. A method of making a thermostat construction as set forth in claim 11 and including the step of forming said other spring means to comprise a compression spring having opposed ends.

13. A method of making a thermostat construction as set forth in claim 12 and including the steps of operatively bearing one of said ends of said spring against one of said units, and operatively bearing the other of said ends of said spring against one of said members.

14. In a method of making a single valve vehicle-type thermostat construction, said method comprising the steps of providing a temperature responsive device having a piston member and a cylinder member that are adapted to provide relative movement therebetween when said device senses certain temperatures, operatively interconnecting a single valve seat unit to one of said members, operatively interconnecting a single valve closure unit to the other of said members so as to be adapted to control fluid flow through said valve seat unit in relation to the position of said valve closure unit relative to said valve seat unit as determined by the temperature being sensed by said device, and operatively interconnecting spring means to one of said members and to one of said units to always tend to hold said units against each other in a closed condition so as to prevent any fluid flow through said valve seat unit and, thus, through said thermostat construction, the improvement comprising the steps of operatively interconnecting another spring means to said members to continuously urge said members together with a loading force even when said units are against each other in said closed condition thereof, forming said other spring means to comprise a compression spring having opposed ends, operatively bearing one of said ends of said spring against one of said units, and operatively bearing the other of said ends of said spring against one of said members, said steps of operatively bearing causing said one of said ends of said spring to operatively bear against said valve seat unit and said other of said ends of said spring to operatively bear against said piston member.

15. A method of making a thermostat construction as set forth in claim 14 and including the step of disposing said spring so as to be coaxially aligned with said piston member.

16. A method of making a thermostat construction as set forth in claim 15 and including the steps of forming said piston member to have a free end, disposing a spring retainer on said free end of said piston member, and bearing said other of said ends of said spring against said spring retainer.

17. A method of making a thermostat construction as set forth in claim 16 and including the steps of forming said valve seat unit to have a tubular projection means, and disposing said one of said ends of said spring in said tubular projection means to be retained thereby.

18. A method of making a thermostat construction as set forth in claim 11 and including the step of forming said other spring means to cooperate with said device and the first-named spring means to provide for a relatively smooth and gradual opening of said units between said closed position thereof to a full flow open position thereof.

19. A method of making a thermostat construction as set forth in claim 18 and including the step of forming said other spring means to comprise a compression spring.

20. A method of making a thermostat construction as set forth in claim 19 and including the step of forming the first-named spring means to comprise a compression spring.

* * * * *